(12) United States Patent
Noehl et al.

(10) Patent No.: US 8,534,436 B2
(45) Date of Patent: Sep. 17, 2013

(54) DUAL CLUTCH

(75) Inventors: Oliver Noehl, Buehlertal (DE); Ivo Agner, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 238 days.

(21) Appl. No.: 13/003,938

(22) PCT Filed: Jun. 29, 2009

(86) PCT No.: PCT/DE2009/000901
§ 371 (c)(1),
(2), (4) Date: Jan. 13, 2011

(87) PCT Pub. No.: WO2010/006578
PCT Pub. Date: Jan. 21, 2010

(65) Prior Publication Data
US 2011/0114435 A1    May 19, 2011

(30) Foreign Application Priority Data
Jul. 14, 2008   (DE) .................... 10 2008 033 034

(51) Int. Cl.
*F16D 25/10* (2006.01)
(52) U.S. Cl.
USPC .................................. 192/48.606; 192/48.91

(58) Field of Classification Search
USPC .............. 192/48.602, 48.603, 48.606, 48.618
See application file for complete search history.

(56) References Cited

U.S. PATENT DOCUMENTS

| | | | | |
|---|---|---|---|---|
| 3,403,755 | A | * | 10/1968 | Barrett et al. ................ 188/71.5 |
| 5,878,856 | A | * | 3/1999 | Sudau et al. ................ 192/70.17 |
| 7,325,291 | B2 | * | 2/2008 | Ahnert ............................ 29/469 |
| 7,392,890 | B2 | * | 7/2008 | Agner .......................... 192/48.8 |
| 7,484,607 | B2 | * | 2/2009 | Schneider et al. .......... 192/55.61 |
| 2004/0099499 | A1 | * | 5/2004 | Orlamunder et al. ........ 192/48.8 |
| 2005/0067251 | A1 | * | 3/2005 | Braford et al. ............. 192/70.12 |
| 2005/0252745 | A1 | * | 11/2005 | Vanselous et al. ........... 192/48.8 |
| 2006/0163019 | A1 | * | 7/2006 | Feldhaus et al. ............. 192/48.8 |

FOREIGN PATENT DOCUMENTS

| | | |
|---|---|---|
| EP | 1 632 687 A | 3/2006 |
| FR | 2 797 004 A | 2/2001 |
| WO | 2004/048794 A | 6/2004 |
| WO | 2008/046379 A | 4/2008 |

* cited by examiner

*Primary Examiner* — David D Le
*Assistant Examiner* — Mark Manley
(74) *Attorney, Agent, or Firm* — Lucas & Mercanti, LLP

(57) ABSTRACT

A dual clutch which has two friction clutches, a central pressure-exerting plate and two pressure plates which are axially movable relative to the pressure-exerting plate with the interposition of the friction linings of two clutch disks, which each mesh with one gearbox input shaft, of actuating devices. The dual clutch is held at the drive-input side and is supported at the gearbox side by an actuating system, which is rotatably held on the clutch housing, for actuating the pressure plates.

23 Claims, 5 Drawing Sheets

DUAL CLUTCH

Figure 1:
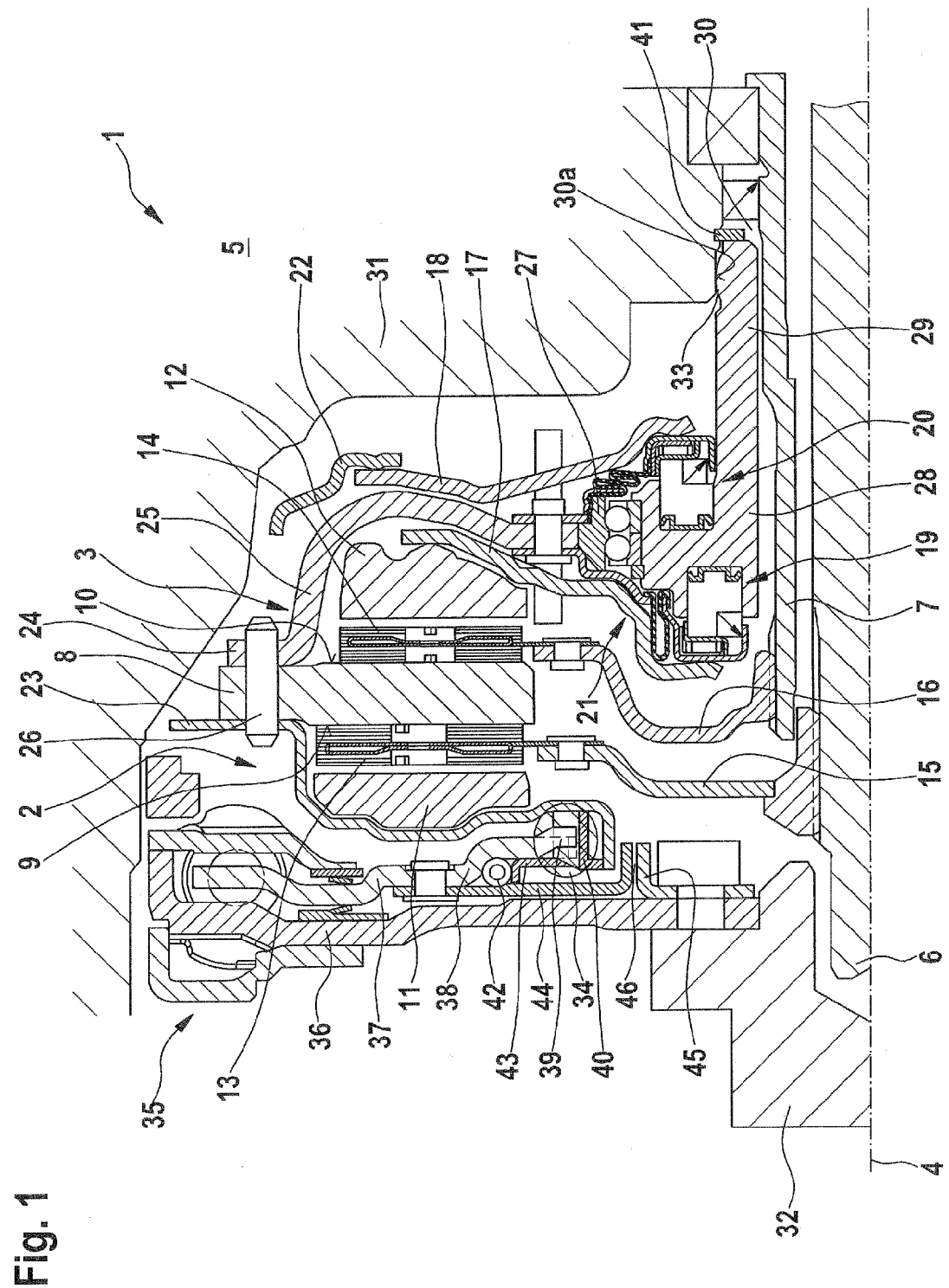

This application is a 371 of PCT/DE2009/000901 filed Jun. 29, 2009, which in turn claims the priority of DE 10 2008 033 034.5 filed Jul. 14, 2008, the priority of both applications is hereby claimed and both applications are incorporated by reference herein.

The invention relates to a dual clutch with two frictional clutches driven by a drive unit, with a common clutch housing and a contact pressure plate having two contact pressure surfaces fixedly connected to the clutch housing, and with two axially displaceable pressure plates which each face one of the contact pressure surfaces.

Dual clutches with two frictional clutches, with a clutch housing and a central contact pressure plate fixedly connected to the clutch housing are known. In this connection, the pressure plates are axially displaced by actuating devices by actuating radially inwardly an axially directed plate spring or lever elements with a predetermined disconnecting path. Depending on the configuration of the corresponding frictional clutch as forcibly pressed or pulled closed, i.e. is forcibly closed, or as frictional clutch which is forcibly pressed open or pulled open, i.e., forcibly opened, the plate spring or lever elements are supported by means of a one-armed or a two-armed lever at the clutch housing with the formation of a gear ratio, so that the axial path of the actuating device is longer than the path of the pressure plate from the completely opened state of the frictional clutch, in which no torque is transmitted, to the completely open state in which the maximum torque is transmitted.

Due to the comparatively high weight of dual clutches, the dual clutches, aside from being mounted on the crank shaft, are frequently radially supported on one of the two gear unit input shafts, for example, on the second gear unit shaft constructed as a hollow shaft and coaxially arranged about the first gear unit input shaft. Corresponding support bearings are here frequently arranged between the central contact pressure plate and the hollow shaft. In this connection, the hollow shaft, on the one hand, can be subjected to additional loads, such as radially acting weight forces of the dual clutch, and to imbalances, as well as to axially acting forces during the actuation of the dual clutch which requires a correspondingly adjusted dimensioning of the hollow shaft.

Moreover, the excitation of vibrations can be introduced into the dual clutch from the gear unit, for example, during zero crossings during load alterations, so that corresponding damping measures must be provided in the clutch disks.

Also known from the prior art are dual clutches which are received rotatably on the gear unit housing. In order to absorb the actuating forces of the actuating devices, which rest axially on the gear unit housing relative to the dual clutch, and in order to configure the axial actuating paths in a defined manner, the dual clutch is received by means of a fixed bearing on the gear unit housing. Such a configuration requires a partial assembly of the dual clutch on the gear unit side and drive side.

Therefore, it is the object of the invention to propose a dual clutch which permits a radial support of the dual clutch on the gear unit housing without fixed bearing. Furthermore, the dual clutch is to be mountable as a structural unit.

This object is met by a dual clutch with two frictional clutches driven by one drive unit with a common clutch housing and a contact pressure plate with two contact pressure surfaces rigidly connected to the clutch housing, as well as two axially displaceable pressure plates each facing a contact pressure surface, wherein, between one pressure plate each and the contact pressure plate, are arranged frictional linings connected to a clutch disk rotatably fixedly connected to a gear unit input shaft of a gear unit for forming a frictional engagement by axially acting on the pressure plates by means of an actuating system clampable to a respective actuating device, so that the actuating system is rotatably and axially fixedly received relative to the clutch housing and the dual clutch is radially supported on the clutch housing by way of the actuating system. By integrating the actuating system into the dual clutch, a self-contained power flux for actuating the two frictional clutches is generated by introducing the force required for pressing the clutch disks between the contact pressure plates and the pressure plates into the clutch housing by the actuating devices. For this purpose, a common actuator housing is axially securely supported, for example by means of a support bearing, at the clutch housing. In this manner, the dual clutch can be constructed as an independently operating structural unit which can be tested and assembled as a whole. Only the supply of the actuating devices which may be, for example, slave cylinders to which a pressure is applied or mechanical elements to which electric motors are applied, is provided to the actuating system from the outside. The actuating housing, or rather the actuator housing thereof, is secured to the clutch housing by way of a rotatable receiving means at the clutch housing, while the frictional clutches rotate together with the clutch housing. For compensating for this relative rotation, the actuating devices act on the plate springs, lever springs or a direct transmission device, for acting on the pressure plates with the intermediate arrangement of actuating bearings. The transfer elements which act directly between the actuating devices and the pressure plates, for example stiff piston sheets, act on the pressure plates without lever effects by transferring travel specified by the actuating system directly to the pressure plates in terms of magnitude and value.

The actuator housing may here be supported by means of a clearance fit at the clutch housing and may be centered. For this purpose, between a gear unit input shaft formed as a hollow shaft and the gear unit housing may be formed an annular gap into which an axial projection of the actuator housing axially engages and is centered. In this connection, the dual clutch may be displaceable to a limited extent in the axial direction against the action of an energy storage. In accordance with an advantageous further development, the dual clutch may be received by means of a plug-in toothing so as to be secured against rotation and be displaceable to an axial limited extent, wherein an axial displacement of the dual clutch is limited on the gear unit side axially by a stop and the energy storage is arranged at the drive side. In this manner, the dual clutch is floating as it were and may be clamped by the axially effective energy storage, for example, a plate spring, against the stop on the gear unit side. In order to be able to compensate for large axial tolerances, and to retain the spring effect in the assembly situation, an axially plastically deformable energy storage may be provided which is plastically deformed during the assembly at the spacing to be used. In another embodiment, the dual clutch may also be supported floating freely without being acted upon by an axially effective energy storage unit between a stop position at the gear unit and a stop position at the drive shaft or a structural component connected thereto. This can be effected because the actuating forces are supported by the axially rigid receiving means of the actuating system at the clutch housing by the clutch housing, and the dual clutch is therefore provided with a self-contained force flux.

For compensating for axial offsets of the axes of rotation between drive unit and gear unit, the clearance fit between the actuator housing and the gear unit can be constructed within a predetermined angle so as to be pivotable in an articulated manner. For this purpose, a ballus may be provided at the axial projection of the actuator housing, the ballus having a radius the center point of rotation of which is located on the axis of rotation of the gear unit input shafts.

The input part of the dual clutch may, on the drive side thereof, be connected directly to the crank shaft or, with the intermediate arrangement of a torsional vibration damper, for example a two-mass flywheel, with a primary part and a secondary part. Therein, the plug-in connection can be arranged at the secondary part, i.e., the output part of the torsional vibration damper, while the primary or input part of the two-mass flywheel or the torsional vibration damper can be connected to the drive shaft of the drive unit, for example, a crank shaft of an internal combustion engine. Moreover, the input part of the dual clutch maybe supported on a drive shaft or on a structural component of the drive unit rotatably fixedly connected to the drive shaft, whereby the drive shaft carries a portion of the weight of the dual clutch. The output part of the torsional vibration damper forms a plug-type connection with the input part of the dual clutch. For this purpose, the mounting of the dual clutch may be effected by means of a friction bearing on the drive shaft, wherein the radially inner friction bearing ring is connected on the drive side, for example as an angle ring at the drive shaft, with the formation of an axial projection as bearing surface, and the radially outer bearing ring is formed by an input part of the dual clutch.

In accordance with another embodiment, the dual clutch may be connected on the drive side so as to be axially fixed, for example, to the output part of a torsional vibration damper, such as two-mass flywheel or the drive shaft. In this case, a stop of the clearance fit on the gear unit side can be omitted. In an advantageous manner, between the dual clutch and the drive shaft for damping the axial and/or tumbling vibrations of the drive shaft, and for compensating axial offsets, a structural component which is angular flexible in the axial direction, for example a so-called flex plate, can be provided which may be connected as a drive sheet directly to the dual clutch or to the input part of the torsional vibration damper.

An advantageously constructed dual clutch may be threaded onto the gear unit shafts during the assembly and can be mounted on one of the gear unit input shafts until the gear unit is mounted on the drive side until the positive engagement of the drive shaft or a torsional vibration damper is effected. It may be advantageous in this connection if the actuator housing is, at least during the assembly, additionally rotatably supported on one gear unit input shaft. A corresponding bearing may be provided at one of the gear unit input shafts, preferably on the hollow shaft, and constructed as needle or sliding bearing which is to at least a limited extent axially displaceable on the hollow shaft. In a preferred manner, the support means or the needle or sliding bearing and the support bearing receiving the actuator housing are stacked radially one above the other and arranged axially in line. After the final assembly, the support can absorb a small supporting force of the dual clutch or, in an advantageous manner, can form relative to the actuator housing an air gap after the dual clutch has been received on the drive side.

Serving as drive unit may be, for example, an internal combustion engine with a crankshaft and/or an electric machine with a drive shaft. In combination, a hybrid drive may be provided in which alternatively or supplementing each other at least one internal combustion engine and at least one electric machine form the drive unit.

The two frictional clutches are preferably dry single-disk clutches with one metal frictional surface each at the contact pressure plate and at the pressure plates, as well as clutch disks having frictional linings forming counter frictional surfaces. The frictional linings of the clutch disks are preferably equipped with a lining resilience; furthermore, the pressure plates are closed axially displaceably against the effect of energy storages, such as, for example, plate springs, so that during opening of a frictional clutch the corresponding pressure plate is displaced in the opening direction.

At least one of the two frictional clutches is configured so as to be self-opening. This means that when the load is removed from the actuating device, the frictional clutch is transferred from the closed state into the open state. Preferably, both frictional clutches are constructed so as to be forcibly closed, i.e., as frictional clutches that are pressed closed or pulled closed by the respective actuating device, so that both frictional clutches are self-opening as soon as an actuating device is no longer operating, for example, due to a defect.

By supporting the dual clutch at the gear unit housing, a support of the dual clutch on one of the two gear unit input shafts is avoided, so that these shafts are not subjected to a bending load by the dual clutch and do not require a separate configuration as a result. Moreover, this has the effect that no vibrations, for example, tumbling vibrations, are transmitted from the gear unit into the dual clutch, nor from the dual clutch into the gear unit n this manner. The gear unit may be a gear unit with a principal output and an auxiliary output. However, in a preferred manner, the dual clutch is used for a dual clutch gear unit with two partial drive trains for forming a power shift transmission, in which one partial drive strand each, with the gear unit in gear, transmits torque from the drive unit with the frictional clutch being closed unto the wheels of a motor vehicle, and in the other drive strand, with the frictional clutch being opened a subsequent gear is engaged, or after the gear is engaged, is being made available in the engaged state. A shifting takes place by overlapping of the two frictional clutches of the dual clutch, wherein the closed frictional clutch is slippingly opened and the open frictional clutch is slippingly closed, so that during the overlapping, alternating partial torques are transmitted over the two partial drive trains.

It has been found to be advantageous if both frictional clutches are forcibly closed frictional clutches in order to avoid blocking of the dual clutch gear unit when an actuating device is failing, particularly during an overlapping shifting position. Due to the advantageous arrangement of a central contact pressure plate with oppositely arranged pressure plates of the frictional clutch, the actuating paths for closing the frictional clutches are arranged in their function opposite to each other.

The actuating devices may be mechanical lever devices which are driven radially from the outside, for example, by an electric motor. Particularly advantageous is a pneumatic or preferably a hydrostatic actuation of the dual clutch, wherein the actuator housing is configured as a slave cylinder housing in which is accommodated a slave cylinder to which pressure is applied from the outside for acting on a transfer element. The slave cylinders have for this purpose each an annular piston or individual pistons distributed over the circumference which are displaceable axially in a pressure chamber to which pressure can be applied from the outside and actuate the transfer elements with the intermediate arrangement of an actuating bearing.

The pressure chambers of the slave cylinders are loaded, for example, by a master cylinder each which is controlled by means of an electric motor from the control device, or by a pump, possibly with the additional contribution of a pressure reservoir, wherein the pump can be operated by the drive unit or by an electric motor. In an advantageous manner, a so-called power pack can be used which switches several pressure cycles via a central pump and corresponding valves, wherein both frictional clutches are actuated and the switching of the gear unit and the circumferential lubrication of the annular space described below can take place.

Also included in the inventive concept is a frictional clutch with a clutch housing driven by a drive unit and a contact pressure plate fixedly connected to the clutch housing, and with a frictional surface and an axially displaceable pressure plate facing the frictional surface, wherein, between the pressure plate and the contact pressure plate, frictional linings of a clutch disk nonrotatably connected to the gear unit input shaft of a gear unit can be tensioned for forming a frictional engagement by axially acting on the pressure plates by means of an actuating device, characterized in that the actuating device is rotatable relative to the clutch housing and is axially rigidly received at the clutch housing, and the frictional clutch is radially supported by way of the actuating device at a gear unit housing of the gear unit.

The invention is explained in more detail with the aid of FIGS. 1 to 5.

Figure 5:
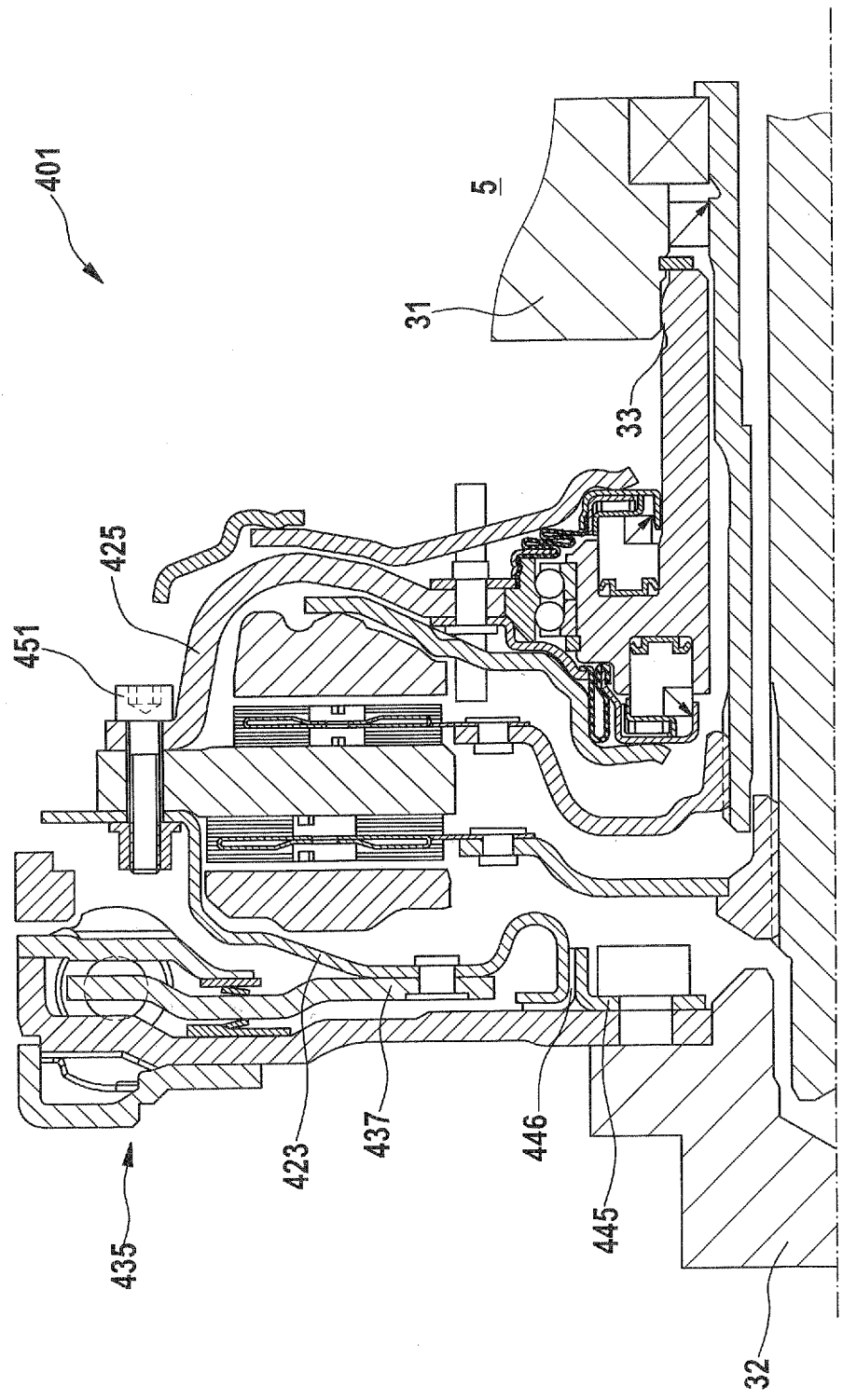

In the drawing:

FIGS. 1 to 4 each show a partial sectional view of embodiments of a dual clutch which is axially displaceable on the drive side to a limited extent;

FIG. 5 shows a partial sectional view of an embodiment of a dual clutch arranged axially rigidly on the drive side.

FIG. 1 shows the upper part of a dual clutch 1 with frictional clutches 2, 3 arranged around a rotational axis 4 of the gear unit input shaft 6,7 of a gear unit 5. The frictional clutches 2, 3 are formed by way of a central contact pressure plate 8 and pressure plates 11, 12 which are displaceable with respect to one frictional surface 9, each, wherein frictional linings 13, 14 of clutch disks 15, 16 are arranged between the frictional surfaces 9, 10 and frictional linings of the pressure plates 11, 12 facing these linings, the clutch disks are nonrotatably connected with a gear unit input shaft each, for instance, by means of toothing. The pressure plates 11, 12 are in the illustrated embodiment acted upon by transfer elements 17, 18 which are displaced radially inwardly by actuating devices 19, 20 of the actuating system 21 directly and without lever effect of the transfer elements 17, 18. The pressure plate 11 of the frictional clutch 2 is pulled closed by means of the tie rods 22, while the frictional clutch 3 is pressed closed by means of the transfer element 17.

The contact pressure plate 8 is fixedly connected to the clutch housing 25 formed by the two housing parts 23, 24, for example, by means of the rivets 26. At the clutch housing 25, the actuator housing 28 of the actuating system 21 is rotatably and axially fixedly received by means of the support bearing 27. For actuating devices 19, 20, the actuating system 21 has slave cylinders, so that the actuator housing 28 is constructed as a slave cylinder housing. This actuator housing 28 is provided with an axial projection 29 which is centered at the receiving surface 30a of a central opening 30 of the gear unit housing 31. For compensating for a non-coaxial arrangement of the axis of rotation 4 of the gear unit 5, and the rotational axis, not shown, of the drive shaft 32, the axial projection 29 is provided with a ballus 33, i.e. a ball portion with a surface which has a radius whose center point is located on the axis of rotation 4, so that the actuator housing 28 and with it the entire dual clutch is pivotable about a small angle from the axis of rotation 4. This capability of being pivotable is facilitated on the drive side by a turning flank play of the plug-type connection 34 to be described in the following.

The dual clutch 1 is received by means of the plug-type connection 34 rotatably fixedly and axially moveable to a limited extent on the drive side. This drive side is in the illustrated embodiment formed by the drive shaft 32, which may be a crank shaft of an internal combustion engine, wherein a torsional vibration damper 35, such as a two-mass flywheel, is received by means of an input part 36. The output part 37 forms, together with a flange part 38 for forming the plug-type connection 34, an internal toothing 39 which is in the circumferential direction meshing with play with an external toothing 40 arranged on the inner circumference of the housing part 23. Due to the axially expanded external toothing 40, a limited axial displacement of the dual clutch is possible, which is limited by the stop 41 provided on the gear housing 31, for example, in the form of a circlip or safety ring, for axial projection 29 of the actuator housing 28. Consequently, the dual clutch is supported so as to be axially floating. The rotary play of the plug-type connection 34 is pretensioned against the effect of an energy storage 42 which acts on a clamping plate 43 in the circumferential direction. Connected to the flange part 38 is a bearing plate 44 which, together with a bearing plate 45 arranged at the drive shaft 32 forms bearing 46, for example, a friction bearing for the output part 37 and, thus, through the dual clutch 1 received at the output part 37 by means of the plug-type connection 34. Aside from the clutch disks 15, 16, the dual clutch is therefore uncoupled from the gear unit shafts 6, 7.

The dual clutch 1 is supplied as a complete structural unit which comprises the actuating system. The connection of the two slave cylinders takes place by means of quick couplings, not shown. Because of the plug-type connection 34, an assembly can be carried out without tools. For this purpose, the dual clutch 1 is pushed onto the gear unit input shafts 6, 7, the pressure connections are subsequently connected to the pressure lines of the pressure generator. With the connection of the drive unit and gear unit 5, the plug-type connection is formed.

Figure 2:
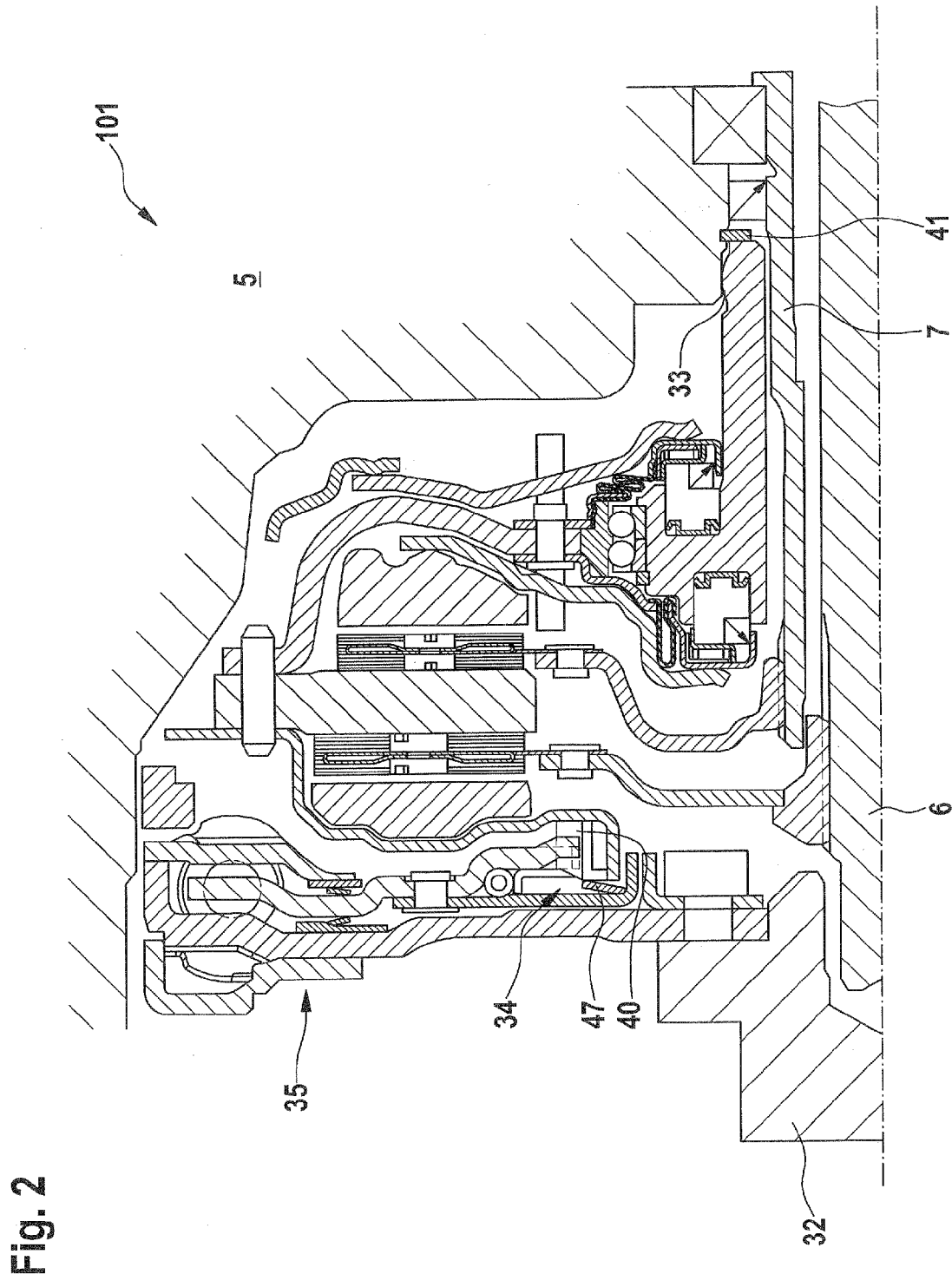

FIG. 2 shows a support of the dual clutch 101 which is modified as compared to the dual clutch 1 of FIG. 1. In this case, the external toothing 40 of the plug-type connection 34 is tensioned by means of an axially acting energy storage means 47, for example, a plate spring or diaphragm spring, relative to the stop 41, so that the dual clutch is axially secured at the stop 41. In order to make available relatively large displacement paths of the dual clutch 101 as a spring extension, the energy storage 47 can be deformed plastically during the assembly. An axial compensation of finishing tolerances, for example, of the parts on the drive side, such as the torsional vibration damper 35, the drive shaft and the like, as well as the parts on the gear side and the dual clutch 101 can take place by way of the plug-type toothing 34 against the action of the energy storage 47. In this case, the effect of the energy storage 47 and the plug-type toothing is dimensioned for the greatest tolerances.

An angle offset of the rotation axes of the gear unit input shafts 6, 7 of the gear unit 5 and the drive shaft 32 takes place by placing the dual clutch 101 in an inclined position. As a result, the plug-type toothing 34 and the ballus 33 serve as a hinge.

Figure 3:
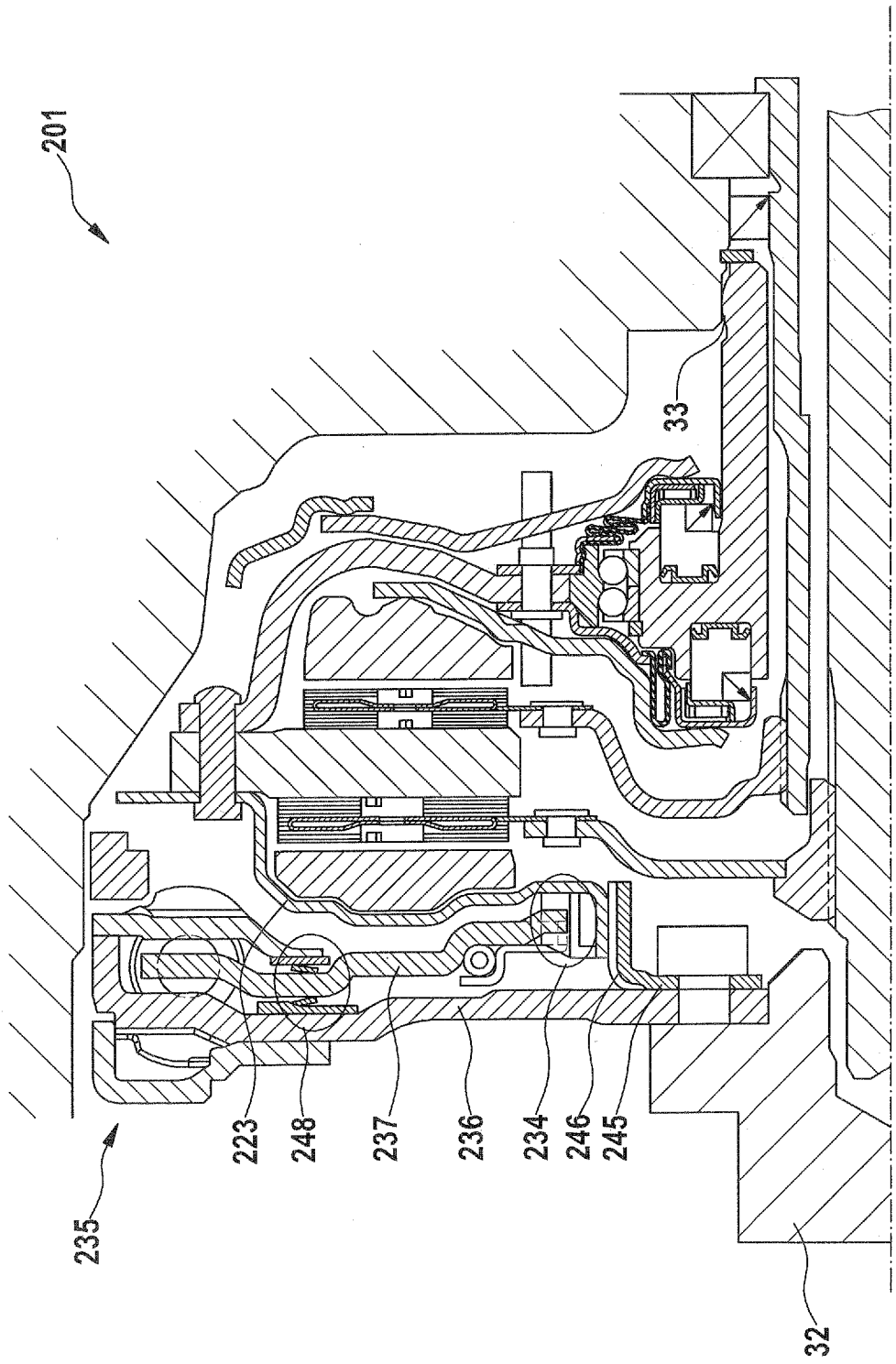

FIG. 3 shows an alternative configuration of a dual clutch 201 which is supported on the input part of 236 of the torsional vibration damper 235 or on the drive shaft. For this purpose, the housing part 223 of the dual clutch 201 forms, together with the bearing plate 245 fixedly received on the drive shaft 32, a bearing 246, for example a friction bearing or a bearing by means of a roller bearing, such as a grooved roller bearing. The plug-type toothing 234 is in this case effective between the output part 237 and the housing part 223, so that the bearing 246 has to compensate the relative rotation of input and output parts of the torsional vibration damper 235. The output part 237, for example, the secondary side of a two-mass flywheel, is positioned via the configuration of the spring constants of the friction device 248 of the torsional vibration damper 235 and the plug-type toothing 234. In order to compensate the angular errors between the centering via the ballus 33 and the bearing 246, the housing part 223 can be constructed so as to be angularly flexible. As an alternative, or additionally, the bearing 246 may be adjusted to the required pivoting angle.

Figure 4:
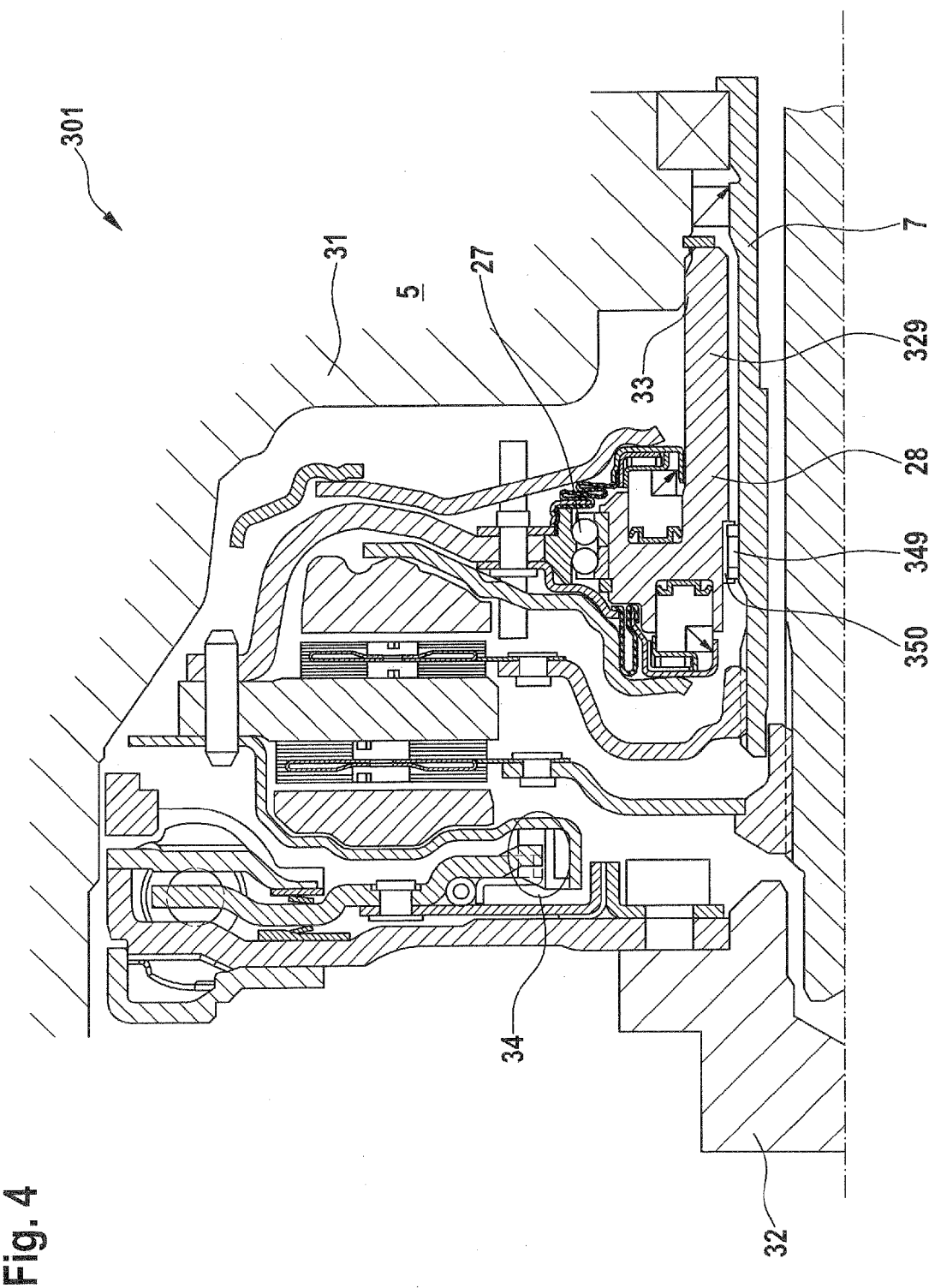

FIG. 4 shows a dual clutch 301 which is modified as compared to the dual clutches of FIGS. 1 to 3 having an additional bearing 349 which may be constructed as sliding bearing or roller bearing with a grease-lubricated needle bearing. The bearing 349 on the gear unit input shaft 7 formed as a hollow shaft stabilizes the support of the axial projection 329 at the gear unit housing 31. For this purpose, the bearing 349 is arranged axially in line radially below the support bearing 27. The bearing is constructed as a loose bearing and stabilizes the actuator housing 28, in particular after the assembly of the dual clutch 301 on the gear unit 5 and prior to the assembly with the drive unit. In this connection, the dual clutch 301 is supported for forming the plug-type connection 34 at the gear unit input shaft 7 and is pre-centered. During formation of the plug-type connection at the connection of the gear unit 5 and the drive unit, an air gap 350 may be formed between the actuator housing 28 and the gear unit input shaft 7, so that the entire bearing of the dual clutch 301 takes place according to the invention at the gear unit housing 31.

FIG. 5 shows an embodiment of a dual clutch 401 which, in contrast to the previously described embodiments, do not have a plug-type toothing. The dual clutch 401 is connected by means of the housing part 423 rigidly to the output part 437 of the torsional vibration damper 435, for example, by rivets. The housing part 423 forms with a bearing plate 445 rigidly arranged on the drive shaft 32 the bearing 446, so that at this bearing the output part 437 as well as the dual clutch 401 is received. The assembly of the dual clutch 401 takes place when the year unit 5 is mounted on the drive unit. In this connection, the housing part 423 pre-assembled on the torsional vibration damper 435 is screwed by means of the screws 451 to the remaining clutch housing 425.

The dual clutch 401 is on the drive side axially rigidly connected to the torsional vibration damper 435 or the drive shaft 32, and the ballus 33 is therefore axially displaceable in the gear unit housing 31 for compensating tolerances in structural parts, and is constructed without stop. For compensating angular offsets between the axes of rotation of gear unit 5 and drive unit, and for damping axial and/or tumbling vibrations of the drive shaft 32, the housing part 423 may be constructed angular flexible.

LIST OF REFERENCE NUMERALS 1 dual clutch
2 frictional clutch
3 frictional clutch
4 axis of rotation
5 gear unit
6 gear unit input shaft
7 gear unit input shaft
8 contact pressure plate
9 frictional surface
10 frictional surface
11 pressure plate
12 pressure plate
13 frictional linings
14 frictional linings
15 clutch disk
16 clutch disk
17 transfer element
18 transfer element
19 actuating device
20 actuating device
21 actuating system
22 tie rod
23 housing part
24 housing part
25 clutch housing
26 rivet
27 support bearing
28 actuator housing
29 axial projection
30 opening
30a receiving surface
31 gear housing
32 drive shaft
33 ballus
34 plug-type connection
35 torsional vibration damper
36 input part
37 output part
38 flange part
39 internal toothing
40 external toothing
41 stop
42 energy storage
43 clamping plate
44 bearing plate
45 bearing plate
46 bearing
47 energy storage
101 dual clutch
201 dual clutch
223 housing part
234 plug-type toothing
235 torsional vibration damper
236 input part
237 output part
245 bearing plate
246 bearing
248 friction device
301 dual clutch
329 axial projection
349 bearing
350 air gap
401 dual clutch
423 housing part
425 clutch housing
435 torsional vibration damper
437 output part
445 bearing sheet
446 bearing
451 screws

The invention claimed is:
1. A dual clutch, comprising:
two frictional clutches driven by a drive unit;
a common clutch housing;
a contact pressure plate rigidly connected to the clutch housing;
two frictional surfaces; and two axially displaceable pressure plates each facing one of the frictional surfaces, wherein between one pressure plate each and the contact pressure plate, frictional linings of a clutch disk non-rotatably connected to the gear unit input shaft of a gear unit can be tensioned with an actuating device each for forming a frictional engagement by axially acting on the pressure plates by means of an actuating system, wherein the actuating system is rotatable relative to the clutch housing and is axially rigidly received on the clutch housing, and the dual clutch is radially supported by means of the actuating system at a gear unit housing of the gear unit, and wherein the actuating system has an actuator housing in common for both actuating devices which actuator housing forms a clearance fit with the gear unit housing, the clearance fit being pivotable in an articulated manner within a predetermined angle.

2. The dual clutch according to claim 1, wherein the dual clutch is displaceable to a limited extent axially against the effect of an energy storage.

3. The dual clutch according to claim 1, wherein dual clutch is on the drive side received by means of a plug-type toothing non-rotationally and axially moveable to a limited extent.

4. The dual clutch according to claim 2, wherein an axial displacement of the dual clutch is limited on the gear unit side in the axial direction by means of a stop and the energy storage is arranged on the drive side.

5. The dual clutch according to claim 2, wherein the dual clutch is tensioned by means of the energy storage against the stop.

6. The dual clutch according to claim 2, characterized in that the energy storage is plastically deformed during the assembly of the dual clutch.

7. The dual clutch according to claim 3, wherein the plug-type connection is arranged between an output part of a torsional vibration damper connected on the input side to a drive shaft of the drive unit.

8. The dual clutch according to claim 1, wherein the dual clutch is axially fixedly connected to the drive side.

9. The dual clutch according to claim 8, wherein the dual clutch is fixedly connected to an output part of a torsional vibration damper connected on the input side to a drive shaft of the drive unit, and is axially displaceable to an unlimited extent to the clearance-fit.

10. The dual clutch according to claim 1, wherein the actuator housing is received by means of a support bearing at the clutch housing.

11. The dual clutch according to claim 10, wherein the actuator housing is at least during the assembly additionally rotatably supported on a gear unit input shaft by a support.

12. The dual clutch according to claim 11, wherein the support is effected by means of an axially displaceable needle bearing or friction bearing.

13. The dual clutch according to claim 12, wherein the support and the support bearing are arranged radially one above the other and axially in line.

14. The dual clutch according to claim 11, wherein an air gap is formed between the actuator housing and the support after the assembly.

15. The dual clutch according to claim 3, wherein the dual clutch is supported on the drive side on a drive shaft of the drive unit by a bearing and is connected for rotation with the output part of a torsional vibration damper by means of the plug-type toothing.

16. The dual clutch according to claim 15, wherein the bearing is effected by means of a friction bearing.

17. The dual clutch according to claim 16, wherein a radially inner bearing ring of the bearing is connected on the drive side and a radially outer bearing ring of the bearing is formed by a housing part of the dual clutch.

18. The dual clutch according to claim 1, wherein the dual clutch is internally force-balanced.

19. The dual clutch according to claim 1, wherein the drive shaft and the contact pressure plate is provided an axially flexible housing part which is stiff in the circumferential direction.

20. The dual clutch according to claim 1, wherein the dual clutch and the actuating system form a complete structural unit which is pre-assembled as an entire unit on the gear unit side.

21. The dual clutch according to claim 1, wherein the dual clutch is received between a stop on the drive side and a stop on the gear unit side so as to be axially floating freely.

22. Frictional clutch, comprising:
a clutch housing driven by a drive unit; and
a contact pressure plate fixedly connected to the clutch housing with a frictional surface as well as a pressure plate which is axially displaceable and faces the frictional surface, wherein between the pressure plate and the contact pressure plate frictional linings of a clutch disk non-rotatably connected to a gear unit input shaft of a gear unit are tensionable for forming a frictional engagement by axial loading of the pressure plates by means of an actuating device, wherein the actuating device is rotatable relative to the clutch housing and is axially fixedly received on the clutch housing and the frictional clutch is radially supported by means of the actuating device at a gear unit housing of the gear unit, and wherein the actuating system has an actuator housing in common for both actuating devices which actuator housing forms a clearance fit with the gear unit housing, the clearance fit being pivotable in an articulated manner within a predetermined angle.

23. A dual clutch, comprising:
two frictional clutches driven by a drive unit;
a common clutch housing;
a contact pressure plate rigidly connected to the clutch housing;
two frictional surfaces; and
two axially displaceable pressure plates each facing one of the frictional surfaces, wherein between one pressure plate each and the contact pressure plate, frictional linings of a clutch disk non-rotatably connected to the gear unit input shaft of a gear unit can be tensioned with an actuating device each for forming a frictional engagement by axially acting on the pressure plates by means of an actuating system, wherein the actuating system is rotatable relative to the clutch housing and is axially rigidly received on the clutch housing, and the dual clutch is radially supported by means of the actuating system at a gear unit housing of the gear unit, wherein the actuating system has an actuator housing in common for both actuating devices which actuator housing forms a clearance fit with the gear unit housing, and wherein the dual clutch is displaceable to a limited extent axially against the effect of an energy storage, the energy storage being plastically deformed during the assembly of the dual clutch.

* * * * *